United States Patent [19]

Hiemstra

[11] Patent Number: 4,856,552

[45] Date of Patent: Aug. 15, 1989

[54] FLOW REGULATING DEVICE

[75] Inventor: Lourens A. V. Hiemstra, Somerset West, South Africa

[73] Assignee: Silkbell Limited, Hong Kong, Hong Kong

[21] Appl. No.: 119,079

[22] Filed: Nov. 10, 1987

[30] Foreign Application Priority Data

Nov. 12, 1986 [ZA] South Africa .................. 86/8587

[51] Int. Cl.[4] .............................................. G05D 7/01
[52] U.S. Cl. ...................................... 137/497; 138/46; 239/542
[58] Field of Search ................ 137/497, 504, 505.12, 137/860; 239/542; 138/46

[56] References Cited

U.S. PATENT DOCUMENTS

| 2,567,568 | 9/1951 | Lievense et al. . | |
| 2,781,059 | 2/1957 | Frey | 138/46 |
| 2,802,486 | 8/1957 | Frey | 138/46 |
| 3,812,876 | 5/1974 | Krieter . | |
| 3,815,636 | 6/1974 | Menzel | 239/542 |
| 3,998,427 | 12/1976 | Bentley | 239/542 X |
| 4,230,149 | 10/1980 | Worthen et al. . | |
| 4,259,988 | 4/1981 | Singh . | |
| 4,313,471 | 2/1982 | Lissau . | |
| 4,354,552 | 10/1982 | Zingg . | |
| 4,448,538 | 5/1984 | Mantel . | |
| 4,493,458 | 1/1985 | Bron . | |
| 4,544,099 | 10/1985 | Norris . | |
| 4,644,974 | 2/1987 | Zingg . | |
| 4,662,401 | 5/1987 | Zingg et al. . | |

FOREIGN PATENT DOCUMENTS

| 372770 | 3/1983 | Austria . | |
| 1948423 | 4/1971 | Fed. Rep. of Germany | 138/46 |
| 2019651 | 11/1971 | Fed. Rep. of Germany . | |
| 2731537 | 1/1979 | Fed. Rep. of Germany | 138/46 |
| 2537668 | 6/1984 | France . | |
| 2583118 | 12/1986 | France . | |
| 634640 | 2/1983 | Switzerland . | |
| 1603982 | 12/1981 | United Kingdom . | |

OTHER PUBLICATIONS

"Drip/Trickle Irrigation in Action", Proc. of Third Int'l Drip/Trickle Irrigation Cong., Nov. 18-21, 1985.

Primary Examiner—Robert G. Nilson
Attorney, Agent, or Firm—Michael N. Meller

[57] ABSTRACT

A flow regulating device comprises a chamber forming element covered by a tube of elastomeric material, which together form a flow passage leading from an inlet port to an outlet port. The flow passage forms a first flow chamber which is partly defined by the elastomeric tube and which is configured such that flow of fluid through the chamber causes inward deflection of the tube and thus constricts the flow cross section of the first flow chamber. The flow passage further forms a second flow chamber downstream of the first flow chamber, the second flow chamber being partly defined by the elastomeric tube, and the configuration being such that flow of fluid through the second flow chamber causes the tube to deflect inwardly and thus constrict the flow cross section of the second flow chamber. In one embodiment the arrangement is such that vortex flow is induced in each of the flow chambers. In a further embodiment, the flow connection between the first and second flow chambers is provided by a tortuous flow passage.

12 Claims, 5 Drawing Sheets

FLOW REGULATING DEVICE

BACKGROUND OF THE INVENTION

This invention relates to a flow regulating device. More particularly, it relates to a flow regulating device for regulating the flow of a fluid from a source which is subject to variations in pressure.

Flow regulating devices can find application in many fields. For example, they can be used in irrigation systems to regulate the flow of water from each of a number of sprinklers or other water emitters forming part of the system. Such systems suffer from the disadvantage that the water pressure at each sprinkler depends on a number of factors such as, for example, the distance of that particular sprinkler from the water main, the flow rate in the laterals leading from the water main to the sprinkler, and the level of the sprinkler (on a sloping or undulating land). Without some form of flow regulation at each sprinkler, the flow rate will vary greatly from sprinkler to sprinkler, which is clearly not desirable.

Another example where flow regulating devices can be used, is in domestic hot water systems, where mixer valves are often provided to mix hot and cold water in a predetermined ratio to obtain water of the desired temperature. Fluctuations in the hot or cold water pressure lead to fluctuations in the ratio, causing undesired fluctuations in the water temperature. If flow regulating devices are used, undesired fluctuations in the water temperature can be minimised.

SUMMARY OF THE INVENTION

According to the invention there is provided a flow regulating device which comprises means defining an inlet port, an outlet port, and a flow passage leading from the inlet port to the outlet port, said flow passage forming a first flow chamber and a second flow chamber downstream of the first flow chamber, the first flow chamber being at least partly defined by a first resiliently deflectable wall which is configured such that deflection thereof inwardly of the first flow chamber constricts the flow cross-section of the second flow chamber.

Said means may further define a plenum on the outside of the first and second resiliently deflectable walls, the plenum being in flow communication with the inlet port.

The configuration of the flow regulating device may be such that, with the first and second resiliently deflectable walls in their undeflected condition, the flow cross-section of the first flow chamber is smaller than that of the second flow chamber.

Each said deflectable wall may be formed by a membrane of an elastomeric material.

Said means may comprise a chamber-forming element in which there are two outwardly open recesses and wherein said deflectable walls are formed by a tube of elastomeric material encircling said element to span each of the recesses, each said chamber being formed by a respective one of the recesses and that part of the elastomeric tube spanning it.

The configuration of the flow regulating device may be such that, in use, vortex flow is induced in at least one of said flow chambers. Thus, at least one of the flow chambers may be of squat cylindrical shape, the corresponding deflectable wall forming one end of the respective flow chamber, said flow passage entering the respective flow chamber tangentially, and said flow passage leaving the respective flow chamber axially.

At least part of the flow passage other than that forming the first and second flow chambers may follow a tortuous flow path.

That part of the flow passage leading from the first flow chamber to the second flow chamber may follow a tortuous flow path.

The invention extends to an irrigation emitter which includes a flow regulation device as herinbefore defined.

The invention will now be described in more detail, by way of example, with reference to the accompanying drawings.

DETAILED DESCRIPTION OF PREFERRED EMBODIMENTS

Figure 1:
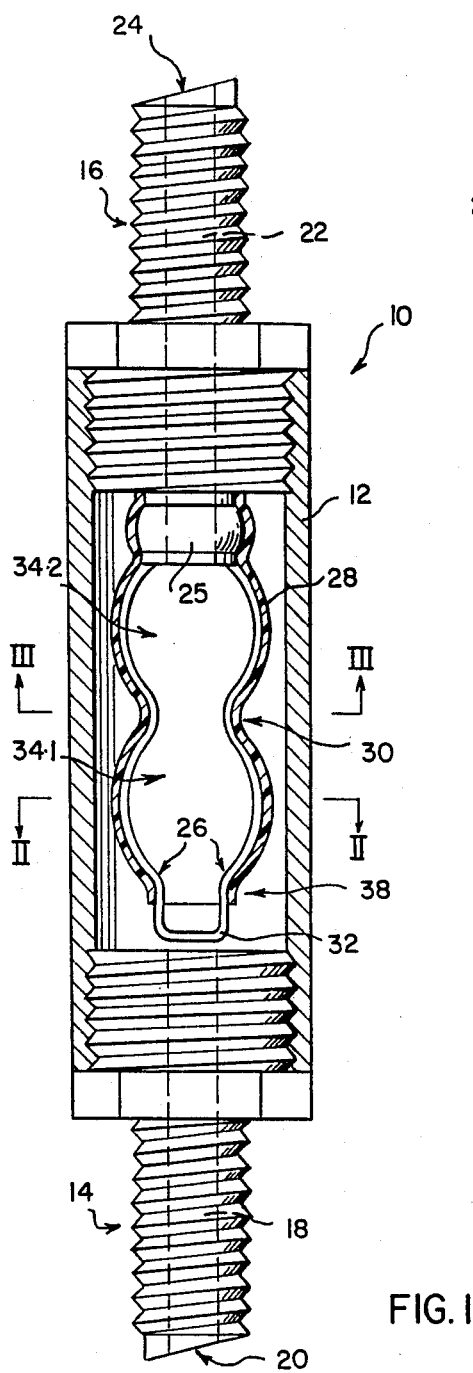
FIG. 1 is a plan view, shown partly in longitudinal section, of a flow regulating device in accordance with a first embodiment of the invention.
Figure 2:
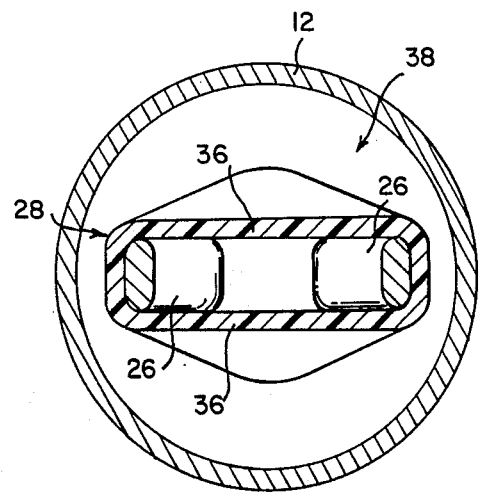
FIG. 2 is a cross-section at II—II in FIG. 1, drawn to a larger scale.
Figure 3:
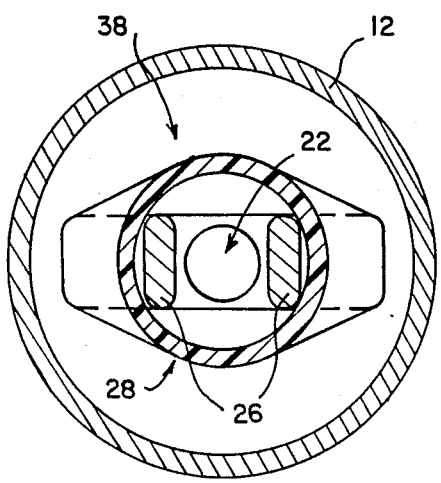
FIG. 3 is a cross-section at III—III in FIG. 1, drawn to the same scale as FIG. 2.

Referring first to FIGS. 1 to 3, reference numeral 10 generally indicates a flow regulating device which comprises a casing 12 which, at one end thereof has a screw-threaded end piece 14 and at the other end thereof a screw-threaded end piece 16. The end piece 14 has an inlet passage 18 leading from an inlet port 20 into the interior of the casing 12, and the end piece 16 has an outlet passage 22 which leads from the interior of the casing 12 to an outlet port 14. The end piece 16 has a nipple 25 which protrudes into the interior of the casing 12, and to the nipple there is connected a chamber-forming element 26. The element 26 comprises a loop of metal or plastics material which is formed into the hourglass shape illustrated in FIG. 1. A tube 28 of elastomeric material is slid over the element 26 and one end thereof pressed onto the nipple 25. The diameter of the nipple 25 is slightly larger than the normal internal diameter of the tube 28, i.e. the diameter when in its relaxed condition, so that the end of the tube is slightly distended and grips tightly onto the nipple. Where, as indicated at 30, opposite sides of the element 26 form a waist, and at the end 32 of the element remote from the nipple 25, the spacing between opposite sides of the element 26 is approximately equal to the normal internal diameter of the tube 28. In the region between the nipple 25 and the waist 30, and between the waist 30 and the end 32, the spacing between opposite sides of the element 26 is greater than the normal internal diameter of the tube 28. This has the effect of flattening the tube 28, to form two flat flow chambers, namely a first flow chamber 34.1 near the end 32, and a second flow chamber 34.2 near the nipple 25. The chambers 34.1 and 34.2 are each defined by two opposed, resiliently deflectable walls 36. In the regions of the end 32, the waist 30, and the nipple 25, the tube 28 remains substantially round in cross-section.

The flow regulating device 10 is intended for use in an irrigation system. In use, the end piece 14 is connected to a source of water under pressure, whereas the end piece 16 is connected to a sprinkler device (not shown). Water will flow from the source through the port 20 and the passage 18 into the casing 12. From there it will flow into the open end of the tube 28, through the chambers 34.1 and 34.2, and then via the passage 22 and the outlet port 24 to the sprinkler device. The space between the inside of the casing 12 and the outside of the tube 28 forms a plenum or cavity 38 which is in flow communication with the inlet port 20 and is therefore subjected to the pressure of the source.

When there is no flow through the device, the tube 28 will be in the condition illustrated in FIGS. 2 and 3, the pressure on the inside and outside of the tube 28 being equal.

When water flows through the chambers 34.1 and 34.2, the pressure inside the chambers 34.1 and 34.2 will drop relative to the static pressure prevailing in the cavity 38, in accordance with the well-known Venturi principle. This causes the walls 36 to deflect inwardly, towards one another, thus constricting the flow cross-section of the chambers 34.1 and 34.2. Constriction of the flow cross-section of the chamber 34.1 will tend to restrict the flow of water to the outlet port 24, leading to a further reduction of the pressure inside the chamber 34.2. Constriction of the flow cross-section of the chamber 34.2, however, will in turn restrict the flow of water through the chamber 34.1, thus tending to increase the pressure inside the chamber 34.1. An increase in pressure in the chamber 34.1 will cause the opposite walls 36 of the first chamber 34.1 to move apart again. It is believed that this sympathetic constriction and expansion of the flow chambers 34.1 and 34.2 regulates the flow of water through the device 10, so as to keep the rate of flow substantially constant over a large range of water pressures at the inlet port 20.

It will be appreciated that the connection 16 may be arranged with the nipple 25, the element 26, and the tube 28 located inside the water main, in which event the casing 12 and the end connection 14 may be omitted.

Figure 4:
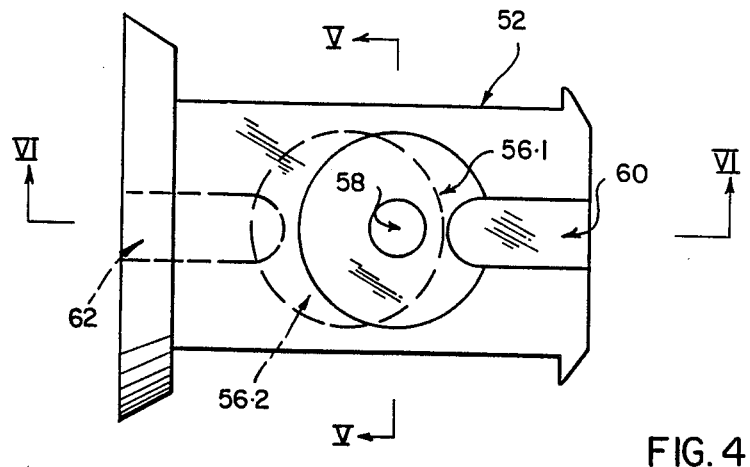
FIG. 4 is a top plan view of a chamber-forming element of a flow regulating device in accordance with a second embodiment of the invention.
Figure 5:
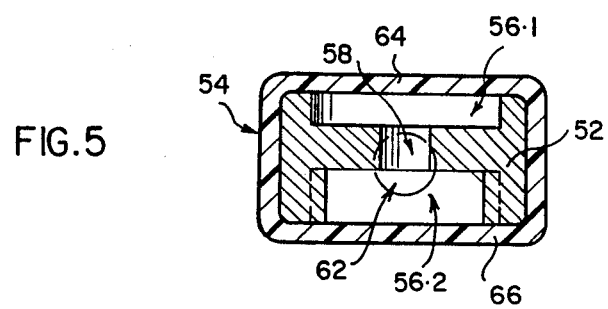
FIG. 5 is a cross-section of the flow regulating device at V—V in FIG. 4, showing also an elastomeric tube which forms part of the device.
Figure 6:
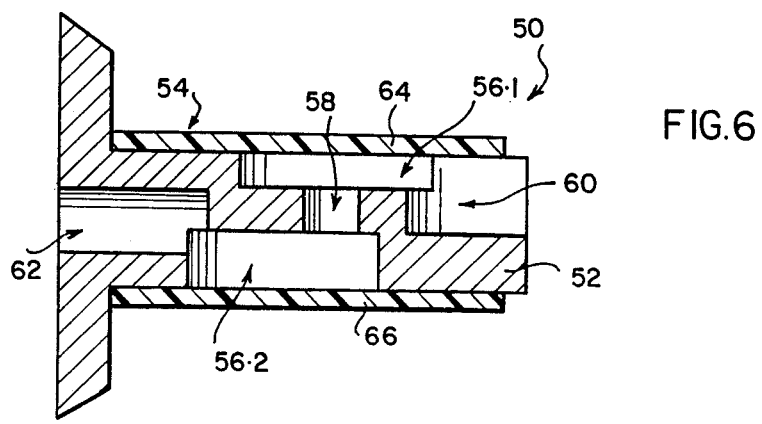
FIG. 6 is a longitudinal section of the flow regulating device at VI—VI in FIG. 4.
Figure 7:
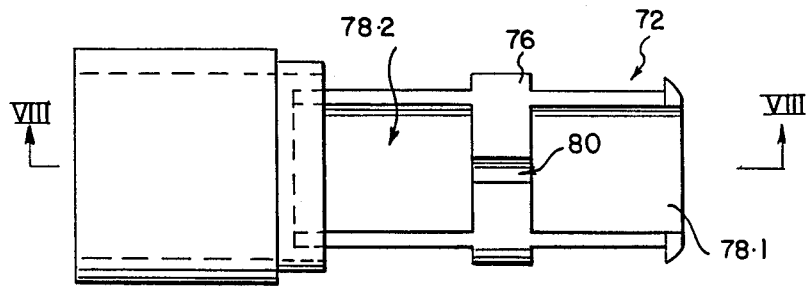
FIG. 7 is a plan view of a chamber-forming element of a flow regulating device in accordance with a third embodiment of the invention.
Figure 8:
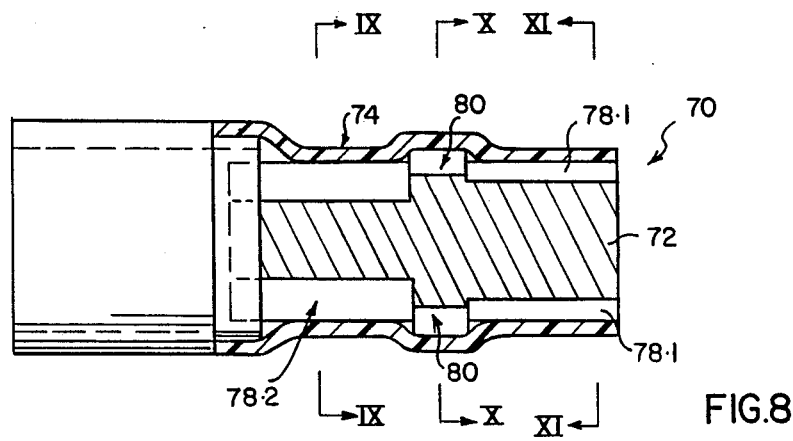
FIG. 8 is a longitudinal section of the flow regulating device at VIII—VIII in FIG. 7, showing also an elastomeric tube in position on the element.
Figure 9:
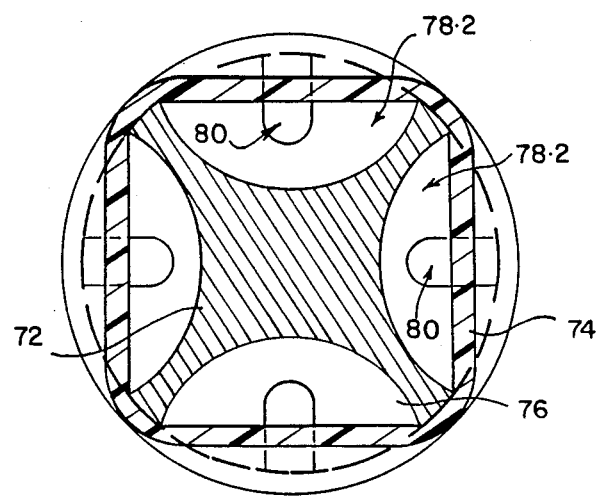
FIG. 9 is a cross-section at IX—IX in FIG. 8, drawn to a larger scale.
Figure 10:
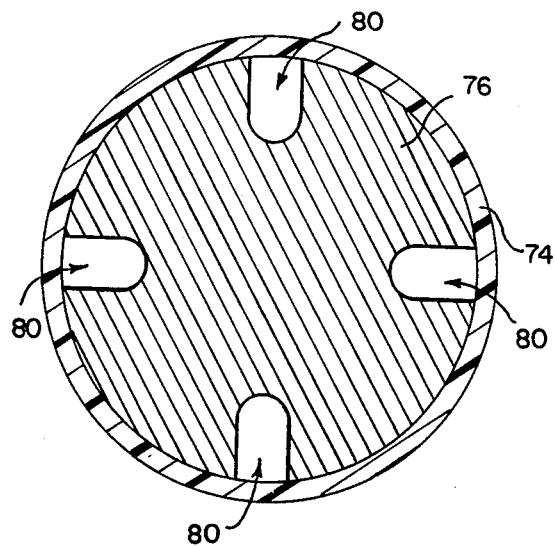
FIG. 10 is a cross-section at X—X in FIG. 8, drawn to the same scale as FIG. 9.
Figure 11:
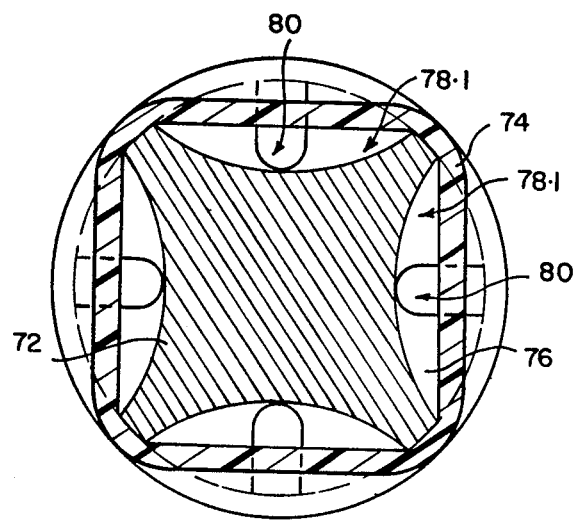
FIG. 11 is a cross-section at XI—XI in FIG. 8, drawn to the same scale as FIGS. 9 and 10.

Referring now to FIGS. 4 to 6, reference numeral 50 indicates a flow regulating device which comprises a chamber-forming element 52 and a tube 54 of elastomeric material in position on the element 52. The element 52 has a generally rectangular cross-section and has two recesses 56.1 and 56.2 formed in opposite faces thereof. An opening 58 extends from the recess 56.1 to the recess 56.2. Furthermore, there is a groove 60 which leads from one end of the element 52 into the recess 56.1, and a passage 62 which leads from the recess 56.2 to the other end of the element.

When the tube 54 is in position on the element 52, it forms the recess 56.1 into a first flow chamber and the recess 56.2 into a second flow chamber, and it also forms the groove 60 into an inlet passage leading into the first flow chamber.

As will be seen in FIGS. 5 and 6, the depth of the first recess 56.1 is less than that of the second recess 56.2, so that the flow cross-section of the first flow chamber will be smaller than that of the second flow chamber. In a practical example, the depth of the second recess 56.2 is about 1.7 times the depth of the first recess 56.1.

Operation of the flow regulating device 50 will be similar to that of the device 10 illustrated in FIGS. 1 to 3. The device will be arranged such that the outside of the tube 54 is subjected to the pressure of the water source. Water will flow through the inlet passage 60 into the first flow chamber 56.1, from there through the opening 58 into the second flow chamber 56.2, and from there through the outlet passage 62 to, for example, a sprinkler device. Flow of water through the first flow chamber 56.1 will cause the pressure in the first flow chamber to drop. This in turn will cause the resiliently deflectable wall 64 formed by the tube 54 to be deflected inwardly towards the bottom of the recess 56.1 and thus constrict the flow cross-section of the first flow chamber. Likewise, flow of water through the second flow chamber 56.2 will cause the resiliently deflectable wall 66 formed by the tube 54 to be deflected inwardly towards the bottom of the recess 56.2, thus constructing the flow cross-section of the second flow chamber.

Referring now to FIGS. 7 to 11, there is shown a flow regulating device 70 which comprises a chamber-forming element 72 and a tube 74 of an elastomeric material in position on the element 72. The element 72 has a central collar 76, four peripherally spaced, longitudinally extending grooves 78.1 on one side of the collar 76, and four peripherally spaced, longitudinally extending grooves 78.2 on the other side of the collar 76. The grooves 78.2 are slightly deeper than the grooves 78.1. Each of the grooves 78.1 is in flow communication with a corresponding one of the grooves 78.2 via a slot 80 in the collar 76.

The tube 74, when in position on the element 72, forms each of the grooves 78.1 into a first flow chamber, and each of the grooves 78.2 into a second flow chamber, the flow cross-section of the flow chambers 78.1 being slightly less than that of the flow chambers 78.2.

Operation of the flow regulating device 70 is similar to that of the flow regulating device 50 illustrating in FIGS. 4 to 6, with the difference that there are now four flow passages in parallel, each flow passage comprising one of the first flow chamber 78.1, the corresponding slot 80, and the corresponding second flow chamber 78.2.

Figure 12:
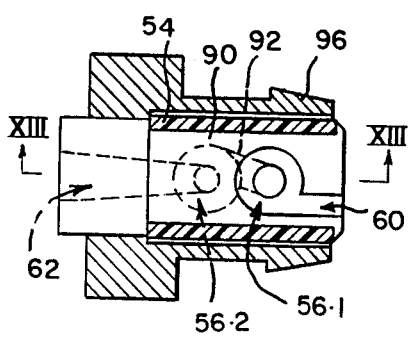
FIG. 12 shows a fow regulating device, partly in longitudinal section, in accordance with a fourth embodiment of the invention.
Figure 13:
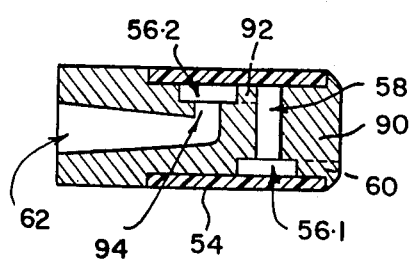
FIG. 13 is a section at XIII—XIII in FIG. 12.

Referring now to FIGS. 12 and 13, there is shown a chamber-forming element 90 which, in certain respects, is similar to the element 52 illustrated in FIGS. 4 to 6, the same reference numerals being used to designate the same or equivalent parts. In the element 90, the groove 60 enters the recess 56.1 tangentially. Furthermore, the opening 58 does not extend directly into the recess 56.2 but instead leads into a second groove 92 in the opposite face of the element 90, and the second groove in turn leads tangentially into the recess 56.2. Finally, the passage 62 does not lead radially from the side of the recess 56.2, but instead leads from a central opening 94 at the bottom of the recess 56.2. When the elastomeric tube 54 is in position on the element 90, it forms the groove 92 into a flow passage leading from the flow chamber 56.1 to the flow chamber 56.2. Reference numeral 96 indicates a casing (omitted from FIG. 13) in which the element 90 is mounted and whereby the device can be connected to a water main. The effect of the tangential arrangement of the inlet passages into each of the flow chambers 56.1 and 56.2 is to create vortices in the flow of water through the first and second chambers 56.1 and 56.2. This will restrict the flow of water to a greater extent than is the case with the construction illustrated in FIGS. 4 to 6. The construction illustrated in FIGS. 12 and 13 can therefore be used in applications where a lower flow rate is required. Alternatively, it can be used in applications where a device of larger dimensions is required for a flow rate which would otherwise have required smaller dimensions, for example in irrigation drippers where small flow passages are easily blocked by foreign material in the water supply.

Figure 14:
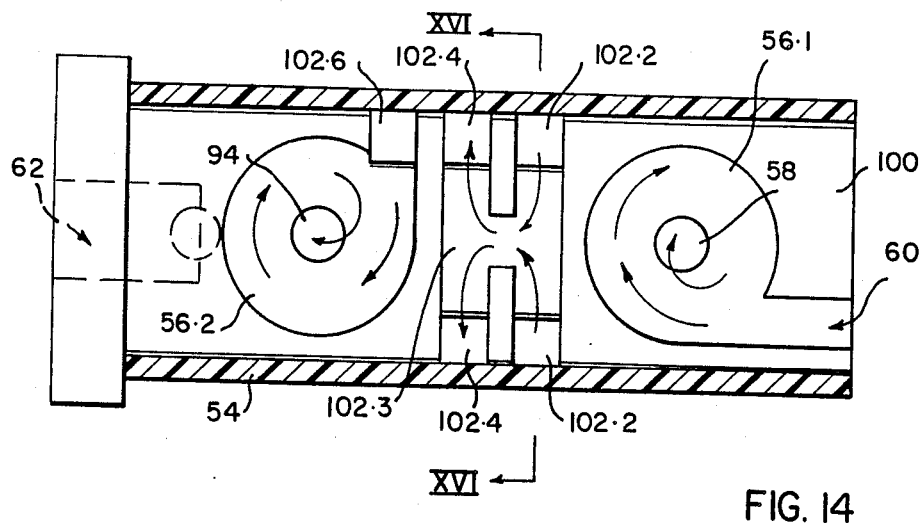
FIG. 14 is a top plan view of a chamber forming element of a flow regulating device in accordance with a fifth embodiment of the invention, showing also (in longitudinal section) an elastomeric tube which forms part of the device.
Figure 15:
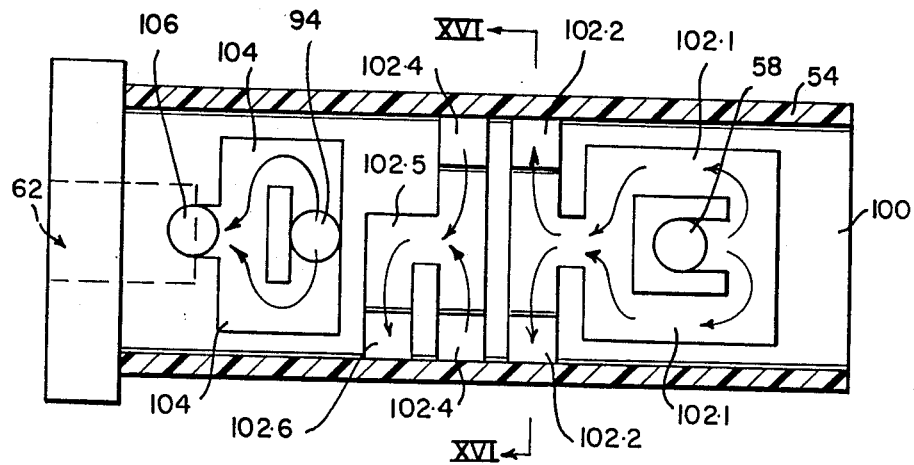
FIG. 15 is an underneath view of the chamber forming element of FIG. 14.
Figure 16:
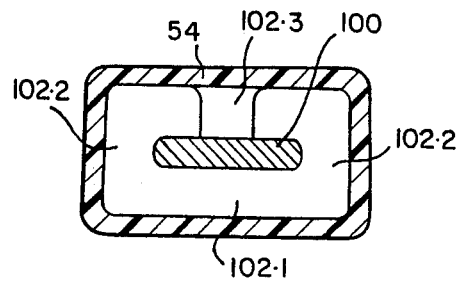
FIG. 16 is a cross section at XVI—XVI in FIGS. 14 and 15.

Referring now to FIGS. 14 to 16, there is shown a chamber forming element 100 which, in certain respects, is similar to the element 90 illustrated in FIGS. 12 and 13, the same reference numerals being used to designate the same or equivalent parts. In the element 100, the recesses 56.1 and 56.2 are arranged on the same (upper) side of the element. The opening 58 leading from the centre of the recess 56.1 leads to the other side of the element 90 into a first tortuous passage connecting the opening 58 in flow communication with the recess 56.2. The tortuous passage is formed by grooves in the element 100 which are covered by the elastomeric tube 54. The first part of the tortuous passage is formed by a groove 102.1 on the underside of the element 100, the groove 102.1 splitting into two branches which merge and then split again and lead into grooves 102.2 on opposite lateral sides of the element. The grooves 102.2 lead into a groove 102.3 on the upper side of the element, the groove 102.3 having two branches which merge and then split again, leading into grooves 102.4 on opposite lateral sides of the element. The grooves 102.4 lead into a groove 102.5 on the underside of the element, the groove 102.5 having two branches which merge and lead into a groove 102.6 on one of the lateral sides of the element. The groove 102.6 leads to the upper side of the element, from where it enters tangentially into the second recess 56.2. The central opening 94 which leads from the second recess 56.2 enters a second tortuous passage which is formed by a groove 104 on the underside of the element, the groove 104 having two branches which merge to lead into an opening 106. The opening 106 in turn leads to the outlet port 62. The tortuous passages permit a design which provides a relatively low flow rate without unduly narrowing the flow cross section of the flow passages.

Although the flow chambers 56.1 and 56.2 are shown to have vertical walls, it has been found that the flow regulation can be improved by providing the chambers with sloping walls so that the diameter of the chambers decreases in a direction away from the deflectable walls.

Proper operation of the flow regulators of the invention depends on the sensitivity of the flow chambers, in other words the degree to which the flow cross section of the chambers decrease with a given increase in the flow rate through them. The sensitivity depends into alia on the span of the deflectable wall and on the depth of the chamber. The ratio of span to depth of the chamber is therefore an approximate measure of sensitivity. The upstream chamber should be more sensitive than the downstream chamber, and there should be a correct ratio between the sensitivity of the upstream chamber and that of the downstream chamber. This can best be determined by trial and error. For example, adjustments may first be made to the depth of upstream chamber until the desired flow rate is obtained. Thereupon, the depth of the downstream chamber can be adjusted until the desired flow regulation is obtained.

It will be appreciated that the two flow chambers need not necessarily be bounded by physical walls but could be formed in operation by two parts of the tube forming two independently deflectable walls, one downstream of the other.

What is claimed:

1. A flow regulating device which comprises means for defining an inlet port, an outlet port and a flow passage leading from the inlet port to the outlet port, said flow passage forming a first flow chamber and a second flow chamber downstream of the first flow chamber, the first flow chamber being partly defined by a first resiliently deflectable wall whose span across the width of the first flow chamber is substantially greater than the depth of the first flow chamber and which is configured such that fluid flowing through the first flow chamber, be Venturi action, causes deflection of a first deflectable wall inwardly of the first flow chamber to constrict the flow cross-section of the first flow chamber, and the second flow chamber being partly defined by a second resiliently deflectable wall whose span across the width of the second flow chamber is substantially greater than the depth of the second flow chamber and which is configured such that fluid flowing through the second flow chamber, by Venturi action, causes deflection of the second deflectable wall inwardly of the second flow chamber to constrict the flow cross-section of the second flow chamber.

2. A flow regulating device according to claim 1, wherein said means further defines a plenum on the outside of the first and second resiliently deflectable walls, the plenum being in flow communication with the inlet port.

3. A flow regulating device according to claim 1, wherein each said deflectable wall is formed by a membrane of an elastomeric material.

4. A flow regulating device according to claim 1, whose configuration is such that, in use, vortex flow is induced in at least one of said flow chamber.

5. A flow regulating device according to claim 4, wherein at least one of the flow chambers is of squat cylindrical shape, the corresponding deflectable wall forming one end of the respective flow chamber, said flow passage entering the respective flow chamber tangentially, and said flow passage leaving the respective flow chamber axially.

6. A flow regulating device according to claim 1, wherein at least part of the flow passage other than that forming the first and second flow chambers follows a tortuous flow path.

7. A flow regulating device according to claim 6, wherein that part of the flow passage leading from the first flow chamber to the second flow chamber follows a tortuous flow path.

8. An irrigation emitter which includes a flow regulation device according into claim 1, to regulate the flow of water from said emitter.

9. A flow regulating device according to claim 1, wherein the first and second flow chambers are configured such that, for a given change in flow through the first and second flow chambers, the degree to which the flow cross-section of the first flow chamber changes differs from the degree to which the flow cross-section of the second flow chamber changes.

10. A flow regulating device according to claim 9, wherein the first and second flow chambers are configured such that, for a given increase in flow through the first and second flow chambers, the degree to which the flow cross-section of the first flow chamber decreases is greater than the degree to which the flow cross-section of the second flow chamber decreases.

11. A flow regulating device which comprises means for defining an inlet port, an outlet port and a flow passage leading from the inlet port to outlet port, said flow passage forming a first flow chamber and a second flow chamber downstream of the first flow chamber, the first flow chamber being at least partly defined by a first resiliently deflectable wall which is configured such that deflection thereof inwardly of the the first flow chamber constricts the flow cross-section of the first flow chamber, the second flow chamber being at least partly defined by a second resiliently deflectable wall which is configured such that deflection thereof inwardly of the second flow chamber constricts the flow cross-section of the second flow chamber, and the configuration of said first and second flow chambers further being such that, with the first and second resiliently deflectable walls in their undeflected condition, the flow cross-section of the first flow chamber is smaller than that of the second flow chamber.

12. A flow regulating device which comprises means for defining an inlet port, an outlet port and a flow passage leading from the inlet port to outlet port, said flow passage forming a first flow chamber and a second flow chamber downstream of the first flow chamber, the first flow chamber being at least partly defined by a first resiliently deflectable wall which is configured such that deflection thereof inwardly of the the first flow chamber constricts the flow cross-section of the first flow chamber, the second flow chamber being at least partly defined by a second resiliently deflectable wall which is configured such that deflection thereof inwardly of the second flow chamber constricts the flow cross-section of the second flow chamber, wherein said means comprises a chamber-forming element in which there are two outwardly open recesses, and wherein said deflectable walls are formed by a tube of elastomeric material encircling said element to span each of the recesses, each said chamber being formed by a respective one of the recesses and that part of the elastomeric tube spanning it.

* * * * *